United States Patent [19]

Falk et al.

[11] 4,264,229
[45] Apr. 28, 1981

[54] COUPLING

[75] Inventors: Curt G. Falk; Ulla K. Falk, both of Hudiksvall, Sweden

[73] Assignee: Curt Falk AB, Hudiksvall, Sweden

[21] Appl. No.: 47,703

[22] Filed: Jun. 12, 1979

[30] Foreign Application Priority Data

Jun. 15, 1978 [SE] Sweden ................... 7806923

[51] Int. Cl.³ ............... F16L 13/00; F16L 33/16; F16D 1/06
[52] U.S. Cl. ........................... 403/5; 403/15; 403/31; 403/297; 192/85 AT
[58] Field of Search ............ 403/5, 31, 15, 297; 192/85 AT

[56] References Cited

U.S. PATENT DOCUMENTS

| 2,277,554 | 3/1942 | McCoy | 192/85 AT X |
| 3,486,776 | 12/1969 | LeBaron | 403/31 X |

FOREIGN PATENT DOCUMENTS

| 2403337 | 8/1974 | Fed. Rep. of Germany |  |
| 1092416 | 11/1954 | France |  |
| 569773 | 8/1957 | Italy | 403/5 |
| 408552 | 9/1966 | Switzerland |  |
| 1069883 | 5/1967 | United Kingdom |  |
| 1141182 | 1/1969 | United Kingdom |  |
| 1170921 | 11/1969 | United Kingdom |  |
| 2001724 | 2/1979 | United Kingdom |  |
| 2001725 | 2/1979 | United Kingdom |  |

Primary Examiner—James Kee Chi
Attorney, Agent, or Firm—Fleit & Jacobson

[57] ABSTRACT

A coupling includes at least one thin-walled sleeve which forms an axially extending defining wall of a substantially annular chamber. The chamber is arranged to be supplied with a pressure medium to elastically deform said sleeve in a radial direction into clamping engagement with a surface on an element which is to be connected to the coupling, the shape and dimension of said surface substantially corresponding to the shape and dimension of a surface on the sleeve remote from said chamber. The chamber has extending therefrom a channel arrangement which is arranged to cooperate with coupling-release means which can be activated by relative movement between said surfaces, or by a given torsional deformation thereof, to a state in which pressure medium can flow through said channel arrangement from said chamber to relieve the chamber of pressure acting therein.

11 Claims, 6 Drawing Figures

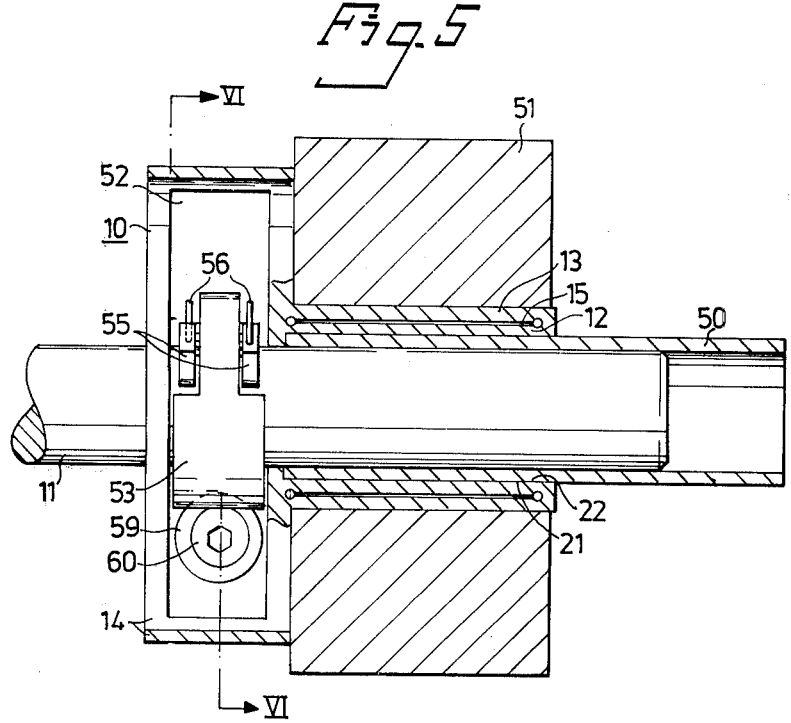
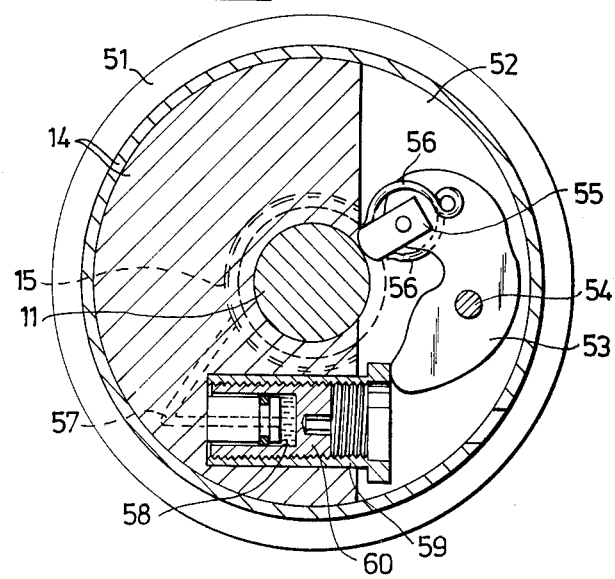

COUPLING

The present invention relates to a coupling of the kind which includes at least one thin-walled sleeve which forms an axially extending defining wall of a substantially annular chamber, the chamber being arranged to be supplied with a pressure medium for substantially elastically deforming said sleeve in a radial direction into clamping engagement with a surface on an element which is to be connected to the coupling, the shape and dimension of said surface substantially corresponding to the shape and dimension of a surface on the sleeve remote from said chamber.

Couplings of this kind are previously known from, for example, the Swiss Pat. No. 408 552 and the French Pat. No. 1 092 416.

The object of the present invention is to provide a novel and useful coupling of the above kind, which is provided with a safety device which requires but a relatively small space and by which the elements connected together by said coupling are disengaged one from each other when said elements are subjected to an overload.

To this end it is proposed in accordance with the invention that in a coupling of the aforedescribed kind the chamber has extending therefrom a channel arrangement which is arranged to cooperate with coupling-release means which can be activated by relative movement between said surfaces, or by a given torsional deformation thereof, to a state in which pressure medium can flow through said channel arrangement from said chamber, to relieve the chamber of pressure acting therein. In this way, there is obtained a very reliable free-coupling function with the use of but a few, inexpensive additional components.

When the chamber is relatively narrow in its radial direction, at least one of the axially extending defining walls of the chamber has arranged in the surface thereof facing the interior of the chamber, said grooves facilitating the flow of said pressure medium to said channel arrangement upon activation of said coupling-release means.

In this way it is ensured that pressure medium will flow more rapidly from the chamber through the channel arrangement than would otherwise be the case.

In the event of an overload on the coupling, with the subsequent activation of the coupling-release means, there may still be some frictional heat developed by continued relative rotation between said surfaces. To prevent damgage to the element and/or the coupling as a result of said frictional heat, the pressure medium may be one which has friction reducing properties and the channel arrangement may be arranged to open out between said surfaces. Alternatively or in addition thereto, at least one lubricant pocket filled with a suitable lubricant may be arranged in the region between the chamber wall and said surface on said element.

In one form of the coupling-release means, said means includes a shear pipe which communicates with said chamber and which upon relative movement between said surfaces will shear, to permit said pressure medium to flow from said chamber, thereby relieving the pressure on said elastically deformable sleeve.

Alternatively, the coupling-release means may include a valve which is arranged to be opened upon said relative movement between the surfaces or upon said given torsional deformation thereof, to permit pressure medium to flow from said chamber.

In accordance with an advantageous embodiment, the coupling-release means comprises a further chamber located adjacent said surfaces and arranged to contain a medium which will expand when heated by frictional heat developed upon relative movement between said surfaces; a plunger acted upon by said expandible medium; a closure valve arranged in said channel arrangement; and a double-armed lever, each of the ends of which acts on a respective one of said plunger and said closure valve. In this embodiment the expandible medium which may be a gas, is heated by the frictional heat developed by said relative rotation and expands, to displace the plunger cooperating with said further chamber. Displacement of the plunger causes the lever to pivot and the valve to be opened.

Activation of the coupling-release means may be effected by activating means fixedly connected either to said element or to the coupling itself.

It will be understood that in the case of the above-mentioned embodiments when the coupling-release means is activated, the pressure-medium flowing from the chamber will pass out of the coupling, and it will be necessary to re-fill the chamber before re-coupling the element. To avoid this, the channel arrangement may conveniently be a closed channel arrangement which communicates with a further chamber having a movable defining wall. The further chamber is filled with said pressure medium and the movable wall thereof is prevented from moving in the absence of an overload by a pivotable lever arrangement having a first lever arm which bears at one end against said wall and which acts at its other end on said element via a mono-stable second lever arm. When there is no relative movement between said surfaces, the mono-stable lever arm is unable to pivot, and hence the first lever arm will exert pressure on the movable wall, preventing the same from moving. Upon relative movement between said surfaces, however, the mono-stable lever arm will be caused to pivot, causing the pressure to be relieved on said first lever arm and hence also on said wall, whereupon the wall is able to move under the pressure of said pressure medium, to enlarge said further chamber, allowing pressure medium to flow from the first mentioned chamber thereinto.

To enable the pressure medium to be re-pressurized when re-setting the coupling-release means, the movable wall of the further chamber is suitably formed by an externally threaded block which is in meshing arrangement with an internally screw-threaded sleeve, which sleeve is displaceable together with said block and one end of which abuts said lever arrangement. Thus, all that need be done is to unscrew the block somewhat in the sleeve, such that the first and second levers can be readily reset, whereafter the block is again screwed into the sleeve to pressurize the pressure medium.

The invention will now be described in more detail with reference to exemplary embodiments illustrated schematically in the accompanying drawings, alternative features and advantages afforded thereby being disclosed in conjunction therewith.

FIG. 5 is an axial sectional view of a fifth embodiment of the coupling according to the invention.

FIG. 6 is a cross-sectional view taken on the line VI—VI in FIG. 5.

Those elements in the Figures which coincide or substantially coincide with one another have been identified by the same references.

Figure 1:
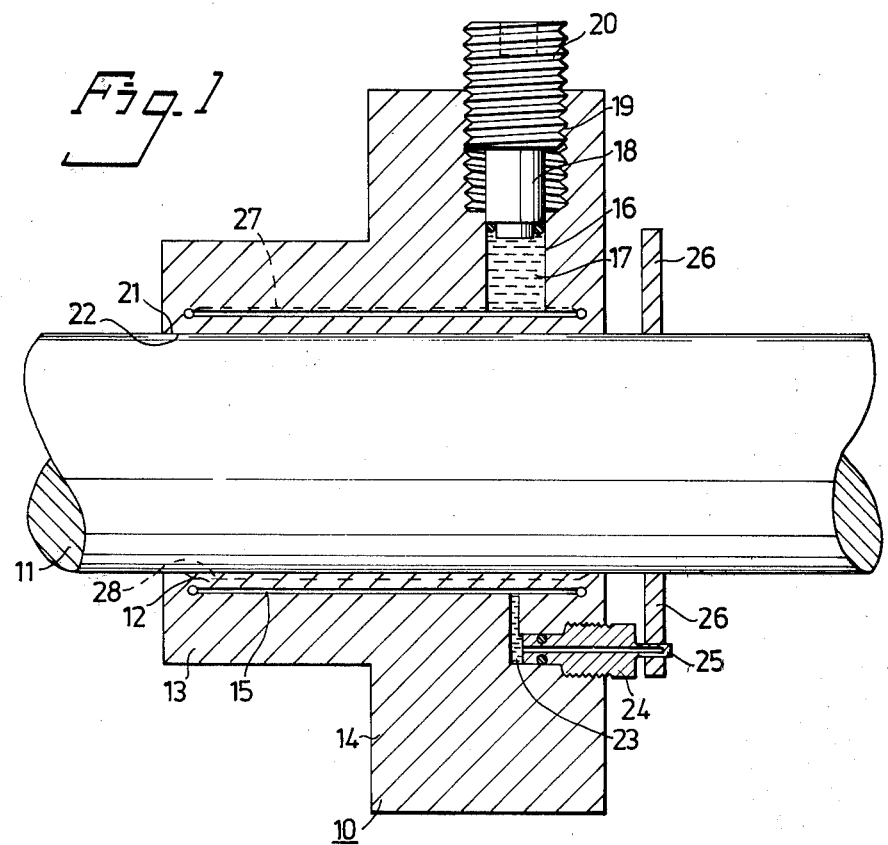
FIG. 1 is an axial sectional view of a first embodiment of the coupling according to the invention.

In FIG. 1 the reference 10 identifies generally a coupling which is connected to an element 11, which in the illustrated embodiment has the form of a shaft. The coupling comprises an inner part 12 in the form of a sleeve and an outer part 13 which surrounds part 12 and which has a flange 14 on which there can be firmly mounted a further element (not shown) which shall be connected to the shaft 11 by means of the coupling 10. The parts 12, 13 are tightly connected together at the ends thereof, for example, by welding, the space between the connecting locations forming an annular chamber 15 which can be connected to a source of pressure medium 17 via a radial inlet 16. The pressure medium 17, which preferably comprises an oil of low viscosity, is compressed in the inlet 16 and the chamber 15 by means of a plunger 18 which seals against the walls of the inlet 16 and which is fixedly mounted on the inner end of a screw 20 which is screwed into a threaded bore 19 in the flange 14. When the pressure medium is thus compressed, the sleeve 12 is deformed radially inwardly in a manner such that the coupling 10 is positively clamped against the surface 21 on the shaft 11 facing the sleeve 12.

When the coupling 10 is overloaded it will rotate relative to the shaft 11, and to prevent the shaft and the coupling being damaged as a result of exaggerated friction between the shaft surface 21 and the inside surface 22 of the sleeve 12, the chamber 15 is provided with a channel arrangement or outlet 23 in which there is mounted a member 24 which normally closes the outlet but which can be activated to a state in which the outlet is caused to be opened and the pressure in the chamber 15 relieved as a result of relative movement between the surface 21 and the inside surface 22 of the sleeve 12. This member 24 is shown to comprise a screw which has a hole passing axially therethrough and which is screwed into an outer part of the outlet 23. The inner end of the screw 24 sealingly abuts the walls of the outlet 23 and carries at its outer end an outwardly projecting shear pipe 25 which is closed at its outer end. The pipe 25 is accommodated in an axial opening in a collar 26 fixedly connected to the shaft 11, said pipe 25 being sheared by relative rotation between the shaft 11 and the coupling 10 in a manner such as to allow pressure medium to depart from the chamber 15 via the outlet 23 and the bore of said screw 24. As indicated at 27, the chamber 15 may be provided on its inside with axially extending grooves for facilitating and accelerating the flow of pressure medium in a direction towards the outlet 23. Further, as indicated at 28, pockets for lubricant can be arranged in the region between the surface 21 and the sleeve 12 for preventing exaggerated friction between the shaft and the coupling when the safety device of said coupling is released upon overloading. If the shear pipe 25 is extended and the collar 26 arranged at a considerable distance from the coupling 10, the coupling-release means will also become activated when the shaft 11 is subjected to a given torsional deformation.

Figure 2:
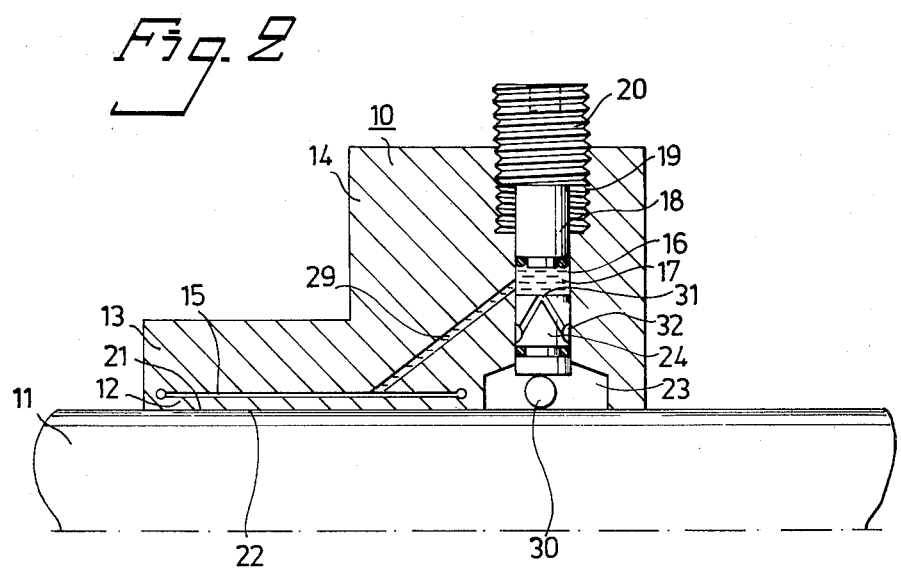
FIGS. 2, 3 and 4 are partial views similar to that of FIG. 1 and illustrate respectively a second, a third and a fourth embodiment of the coupling according to the invention.

In the embodiment illustrated in FIG. 2, the inlet 16 is shown connected to the pressure-medium chamber 15 via an obliquely positioned passage 29, while the outlet 23 extends radially and forms a flared chamber, the radially inner end of which is defined by the shaft surface 21, from which chamber the pressure medium can pass out between the surfaces 21, 22 when the coupling-release means is released. The member 24 of the FIG. 2 embodiment comprises a valve plug which is sealingly displaceable in said outlet. The valve plug is held in the illustrated, sealing position by means of a ball 30 which is located between the shaft surface 21 and the radially inner end of the valve plug 24. With rotation of the shaft 11 relative to the coupling 10 as a result of overloading, the ball 30 will roll in the peripheral direction of the shaft 11 to a position in which it leaves the inner surface of the valve plug 24, such that the valve body brings the chamber 15 into communication, via the channel arrangement 29, 16, 31 and 32, with the radially outer portion of the flared chamber 23, so that the pressure in the chamber 15 is relieved.

Figure 3:
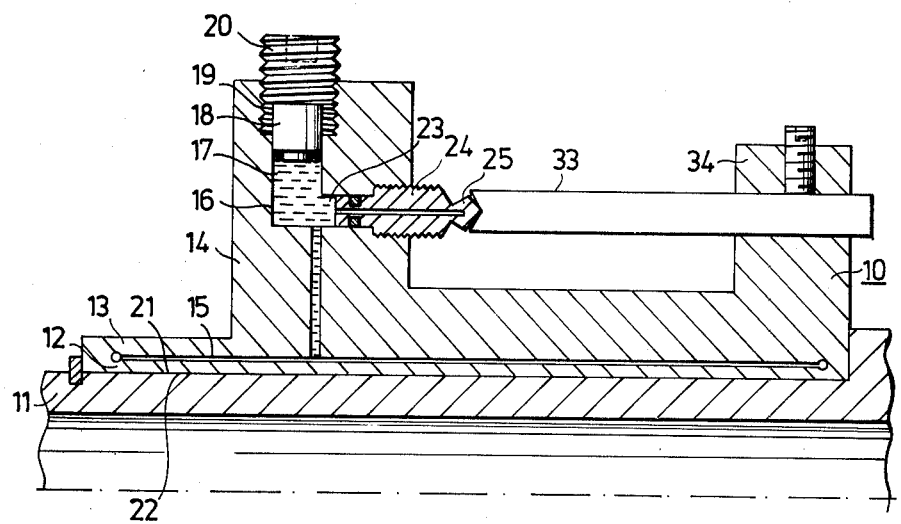

In the embodiment illustrated in FIG. 3, the inlet 16 is shown to be connected to the outlet 23. Similar to the FIG. 1 embodiment, the member 24 has a shear pipe 25 arranged in its outer end, said end being of conical configuration. The shear pipe rests in a conically shaped shear rod 33 which is rigidly connected to a further flange 34 forming part of the coupling and being arranged at a considerable distance from the flange 14. When the coupling is subjected to a given torque, with subsequent torsion of the coupling 10 and the shaft 11, which shaft is tubular in the illustrated embodiment, the shear pipe will shear as a result of the relative movement between the flanges 14 and 34, so that pressure medium can depart from the chamber 15 through the channel arrangement formed by inlet 16, outlet 23 and the bore of the member 24. Subsequent to the coupling being relieved of the pressure therein, said coupling 10 can freely rotate on the hollow shaft 11, which shaft can be keyed, for example, to an engine shaft.

Figure 4:
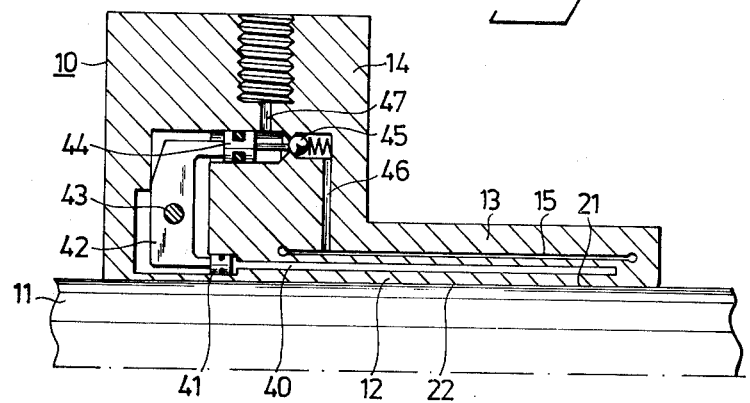

In the FIG. 4 embodiment there is arranged in the sleeve 12 a further chamber 40 in the form of a channel or pocket which contains an expandible substance, such as a gas, liquid or a metal rod having a coefficient of linear expansion which is greater than that of the material from which the coupling is made. Said substance acts on a plunger 41, which in turn acts on one end of a double-arm lever 42. Lever 42 is pivotally mounted on a pivot 43, and the other end of the lever acts on a further plunger 44 which bears against a spring-loaded valve member 45 of a check valve. A channel arrangement 46 connects the chamber 15 to a pressure medium inlet 47. The arrangement is such that when the coupling is overloaded, the heat generated by the friction between the surfaces 21, 22 upon relative rotation therebetween causes the substance in the chamber 40 to expand, whereupon the plunger 41 will be displaced in a manner to pivot the lever 42 in a clock-wise direction. As it pivots, the lever pushes against plunger 44, to move the valve member 45 off its seating, thereby allowing the pressurized medium in chamber 15 to flow therefrom, out through inlet 47 via the channel arrangement 46.

In the embodiment illustrated in FIGS. 5 and 6 the coupling has a pressure medium chamber 15, which is radially defined by two thin-walled sleeves 12, 13 which are elastically separable to clamp a tube portion 50 against the shaft 11 and at the same time to secure an annular member 51 to the outer sleeve 13 of the coupling 10. The coupling includes a part-circular flange portion 14 such as to exhibit a recess 52 accommodating a lever arrangement comprising a double-arm lever 53 pivotally mounted at 54 and a lever arm 55 pivoted on one end of lever 53. The lever arm 55 is biassed by spring means 56 to a position in which it extends radially towards and in engagement with the shaft 11.

The chamber 15 communicates via a channel arrangement 57 with a further chamber 58 having a movable defining wall means. Said wall means comprises an internally screw-threaded sleeve 59 which is slidably arranged in the flange portion 14 and an externally screw-threaded block 60 in meshing engagement with the sleeve 59. As shown, the other end of the lever 53 bears against one end of the sleeve 59. In the illustrated position of the lever arrangement the lever 53 is, because of the position of lever arm 55 relative to the shaft 11, unable to pivot in a counter-clockwise direction to enlargen the chamber 58 by movement of the wall means 59, 60 as a result of the pressure of the medium acting thereupon. In the case of overloading, however, relative rotation between the shaft 11 and the coupling 10 will cause the lever arm 55 to pivot against the action of the spring means 56, thereby freeing the lever 53. The pressurized medium acting on the movable wall means 59, 60 will then cause the sleeve 59 to move axially in a manner to enlargen the further chamber 58, thereby lowering the pressure in the chamber 58 so as to relinguish the clamping forces on the members 50 and 51. It will be understood that the spring means 56 constantly strive to reset the lever arrangement to the illustrated position, but are unable to do so because the pressure medium resists against axial movement of the wall means 59, 60 inwardly. The lever arrangement is reset by unscrewing the block 60 so as to enlargen the chamber 58 still further, to an extent such that the force exerted by the spring means 56 is able to overcome the pressure exerted by said medium. Subsequent to the resetting of the lever arrangement, the block 60 is screwed into the sleeve 59 to presurize said medium, thereby again bringing the coupling into clamping engagement with the members 50 and 51.

The invention is not restricted to the aforedescribed and illustrated embodiments, but can be modified within the scope of the following claims. Thus, the chamber 15 can be defined radially outwardly instead of radially inwardly as illustrated, by a thin axially extending defining wall when the coupling is to be mounted in a bore surrounding said coupling.

What is claimed is:

1. A one-piece coupling of the kind which includes at least one thin-walled sleeve which forms an axially extending defining wall of a radially narrow annular chamber, the chamber being arranged to be supplied with a pressure medium for substantially elastically deforming said sleeve so that a surface of said sleeve is moved in a radial direction into direct clamping engagement with a smooth complementary shaped surface on an element which is to be drivingly connected to the coupling, wherein the chamber has extending outward therefrom a channel arrangement which is arranged to cooperate with coupling-release means which is activatable by relative movement between said surfaces, to a state in which pressure medium can flow through said channel arrangement from said chamber, to relieve the chamber of pressure acting therein, so that said element is able to rotate independently of the coupling.

2. A coupling according to claim 1, wherein at least one of the axially extending defining walls of the chamber exhibits substantially axially extending grooves in the surface facing the interior of the chamber, said grooves facilitating the flow of said pressure medium to said channel arrangement upon activation of said coupling-release means.

3. A coupling according to claim 1, in which the pressure medium has friction-reducing properties, wherein the channel arrangement opens out between said surfaces.

4. A coupling according to claim 1, wherein at least one lubricant pocket is arranged in the region between said surfaces.

5. A coupling according to claim 1, wherein the coupling-release means includes a shear pipe.

6. A coupling according to claim 1, wherein the coupling-release means includes a valve arranged to open upon said relative movement between said surfaces.

7. A coupling according to claim 6, wherein the coupling-release means comprises a further chamber located adjacent said surfaces and arranged to contain a medium which will expand when heated by frictional heat developed upon relative movement between said surfaces; a plunger acted upon by said expandible medium; a closure valve arranged in said channel arrangement; and a double-armed lever, each of the ends of which acts on a respective one of said plunger and said closure valve.

8. A coupling according to claim 1, wherein said element to be connected to said coupling carries a means for activating said coupling-release means.

9. A coupling according to claim 1, wherein the channel arrangement communicates with a further chamber having a movable defining wall and being arranged to be filled with said pressure medium, and wherein said coupling-release means includes said movable wall of said further chamber; a lever arrangement cooperating with said element to be connected to the coupling and with said movable wall in a manner such as to maintain in a first instance the pressure medium at first given pressure in the absence of said relative movement and, in a second instance, to lower said pressure upon said relative movement.

10. A coupling according to claim 9, wherein the lever arrangement includes a pivot arm adapted to abut against said element in said first instance and to be moved out of abutment with said element in said second instance.

11. A coupling according to claim 9 or 10, wherein the movable wall of said further chamber is formed by an externally threaded block which is in meshing arrangement with an internally screw-threaded sleeve, which sleeve is displaceable together with said block and one end of which abuts said lever arrangement.

* * * * *